United States Patent Office 3,543,367
Patented Dec. 1, 1970

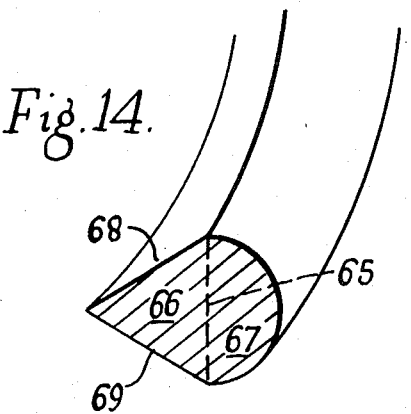
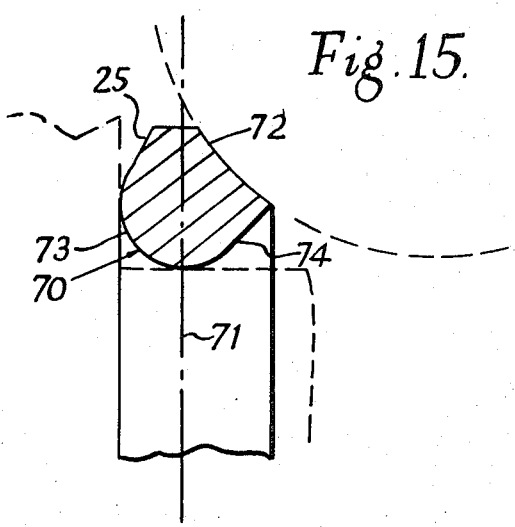

3,543,367
WIRE RACE BALL BEARING MANUFACTURE
Alfred E. R. Arnot, The Bell House, Baughurst,
Basingstoke, Hampshire, England
Filed Jan. 29, 1968, Ser. No. 701,454
Int. Cl. B23p *11/00;* F16c *33/58;* B23b *19/04*
U.S. Cl. 29—148.4                    21 Claims

ABSTRACT OF THE DISCLOSURE

A method of manufacturing a wire-race ball bearing in which wire race rings are formed by bending wire in a stable bending orientation so that the wire does not twist in bending, the wire having a cross-section including at least one ball track. The bearing is assembled so that the bearing balls are in contact with one track on each race ring.

FIELD OF THE INVENTION

The invention relates to a method of manufacturing wire-race ball-bearings and to assembled wire-race ball-bearings.

SUMMARY OF PRIOR ART

Wire-race ball-bearings are known in which four wire rings are provided. Two of the rings are of equal diameter and the other two are likewise of equal diameter which is larger than the other diameter. The two pairs of rings constitute inner and outer bearing rings and bearing balls run between the two pairs of rings.

In cheap bearings of this kind the wires are of circular cross-section but in precision bearings and bearings for heavy loads each wire is provided with a track therein and hence the balls are supported in four tracks.

STATEMENT OF THE PROBLEM

To provide a wire ring with a track the normal method of manufacture used is to bend a wire of circular cross-section into a ring and then grind the track where required in the wire ring.

Wire-race ball-bearings are made in sizes up to many feet, for example thirty feet, in diameter and hence the grinding of a track can present considerable problems and require expensive and complex apparatus for precision work.

OBJECTS OF THE INVENTION

One object of the invention is to provide a method of manufacturing a tracked wire-race ring in which the need for grinding a track into an already formed ring is avoided.

Another object of the invention is substantially to reduce the cost of manufacturing wire-race ball-bearings.

A further object of the invention is to improve the manufacture of wire-race ball-bearings of various types.

Yet another object of the invention is to facilitate the mass-production of wire-race ball-bearings.

Still another object of the invention is to provide a tracked ring for use in wire-race ball-bearings which is of a form such that it can be used as an inner ring or an outer ring of such a bearing depending upon the diameter thereof, whereby the manufacture of a range of bearings of different diameters can be effected with the minimum number of rings of different sizes.

These and other objects and advantages of the invention will become more apparent from the following description in connection with the accompanying drawings.

BRIEF DESCRIPTION OF THE DRAWINGS

FIG. 14 shows one end of a further wire for use in making a wire-race bearing according to the invention, and FIG. 15 shows one end of a yet further wire for use in making a wire-race bearing according to the invention.

DESCRIPTION IN MORE DETAIL OF PRIOR ART

Figure 1:
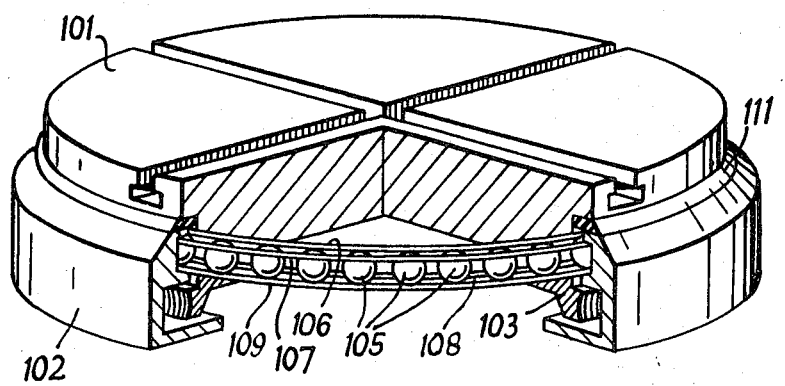
FIG. 1 is a perspective view, partly cut away, of a known wire-race ball-bearing.

The known wire-race ball-bearing shown in FIG. 1 comprises a turntable 101 mounted for rotation relative to an annular base 102. A driving ring 103 engages with a worm 104 (FIG. 2) by means of which rotary drive can be applied to the turntable 101, the driving ring 103 being bolted to the turntable 101.

A plurality of steel balls 105 are located between four wire race rings 106, 107, 108 and 109. The balls 105 are evenly spaced from one another by means of a cage 110, shown in FIG. 2 only. A bearing ring 111 of soft material is located in an annular space between the turntable 101 and the base 102 and serves as a seal.

The wire race rings 106, 107, 108 and 109 are manufactured by forming rings of wire of circular cross-section, each ring subsequently having a track ground therein on which the balls 105 run in the bearing.

Figure 2:
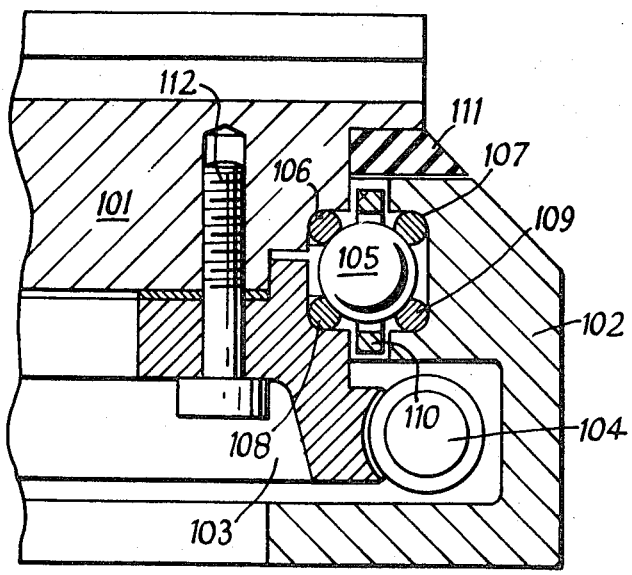
FIG. 2 is an enlarged cross-section of part of the bearing shown in FIG. 1.

To assemble the bearing, the bearing ring 111 is placed on the turntable 101, then the base 102 placed on the bearing ring 111, the parts being inverted relative to the positions shown in FIGS. 1 and 2. The wire race rings 106, 107 and 109 are then fitted into their respective positions and the balls 105 and the cage 110 inserted. Thereafter the wire race ring 108 is fitted into its position in the driving ring 103 and the latter bolted into position. Each of the wire race rings 106 to 109 is formed with a small gap and is of such a diameter that the ring bears resiliently against its respective seating, the rings 106 and 108 gripping the turntable 101 and the driving ring 103 respectively, and the rings 107 and 109 pressing outwards against the base 102. The turntable 101 and the driving ring 103 must be accurately spigotted together and held with bolts 112 to permit assembly of the rings 106 to 109 and balls into their enclosed positions.

DESCRIPTION OF THE PREFERRED EMBODIMENTS

Figure 3:
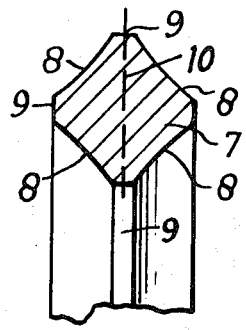
FIG. 3 shows one end of a wire for use in making a wire-race bearing according to the invention.

In FIG. 3 there is shown one end of a high tensile steel wire which has formed therein four tracks 8 resulting in the preferred cross-section 7. The intermediate lands 9 may be either flat or coincident with the circumscribing circle. The wire may be case-hardened or through hardened by thermal or chemical processes or by surface working, or may be plated or hard metal faced or sprayed or otherwise coated, before or after forming into a ring, to provide any desired track characteristic. The material of the wire can be of other preferred bearing material such as tantalum or plastics material such as a synthetic polymeric amide known as nylon.

When a piece of such wire has been formed into a ring, the longitudinal axis of the piece of wire lies in a plane which passes through one or the other of the pairs of opposite lands 9. It will be realised that the cross-section 7 has mirror symmetry relative to such a plane, that is, the two halves of the cross-section lying on opposite sides of such a plane are mirror images of one another. The trace of one such plane on the cross-section 7 is indicated by a broken line 10 in FIG. 3.

Wire having such cross-section 7 can be produced by any of the well known techniques of wire manufacture. However it is advantageous to use different techniques for wires of different thicknesses and according to the quantity required. For example, where a large quantity of fine wire is required, a die having an aperture of the desired shape of cross-section of the wire is made and the wire, initially of for example circular or square cross-section is drawn through the die whereby it acquires the desired non-circular cross-section. In another case, it may be found most economical to impart the desired non-circular cross-section to the wire by rolling, that is, by passing the wire through an aperture corresponding to the shape of the desired cross-section and formed between a cluster of appropriately shaped rollers. Where thicker wire is to be given a non-circular cross-section it may be more convenient to pass the wire through a holding gauge and to mill the wire to the desired form. The term wire is used herein to include all elongated bodies of bearing material from which arcuate elements can be formed by bending. For example, where heavy loads are to be supported the wire of the wire race rings may be several inches thick.

Figure 4:
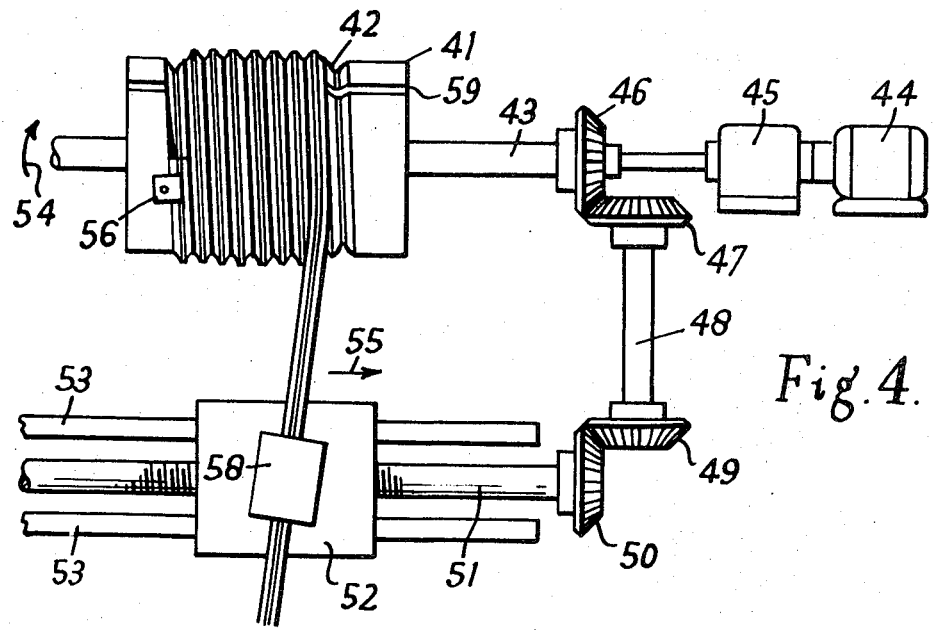
FIG. 4 shows apparatus for producing wire race rings from the wire shown in FIG. 3.

An apparatus for bending the wire of FIG. 3 is shown in FIG. 4 and includes a roller 41 having a helical groove 42 therein and secured to a shaft 43 so as to be rotated in operation by a motor 44 acting through a gear box 45. Coaxially secured to the shaft 43 is a first bevel gear 46 which is engaged with a second bevel gear 47 coaxially secured to one end of a further shaft 48 having at the other end thereof a third bevel gear 49 engaged with a fourth bevel gear 50. The fourth bevel gear 50 is coaxially secured to one end of a lead screw 51 drivingly engaged with a saddle 52 slidably mounted on parallel guides 53. Rotation of the shaft 43 in the direction of the arrow 54 consequently results in like rotation of the roller 41 and in translation of the saddle 52 in the direction of the arrow 55.

A clamp 56 is provided at one end of the groove 42 and serves to secure one end of a wire 57. The wire 57 is supplied through a tensioning head 58 so secured to the saddle 52 that the wire 57 approaches the roller 41 at a predetermined constant angle.

Initially the saddle 52 is further to the left of the position shown in FIG. 4, and the wire 57 leads directly from the tensioning head 58 to the clamp 56. Rotation of the shaft 43 by the motor 44 is then commenced in the direction indicated by the arrow 54 and the saddle 52 moves to the right in FIG. 4 at a rate such that the wire 57 is bent into the helix defined by the groove 42 on the roller 41. The tension in the wire 57 between the roller 41 and the tensioning head 58 is maintained and controlled by the tensioning head 58 and the motor 44 and gear box 45 at a value sufficient to deform the wire 57 into the required helical form.

Figure 5:
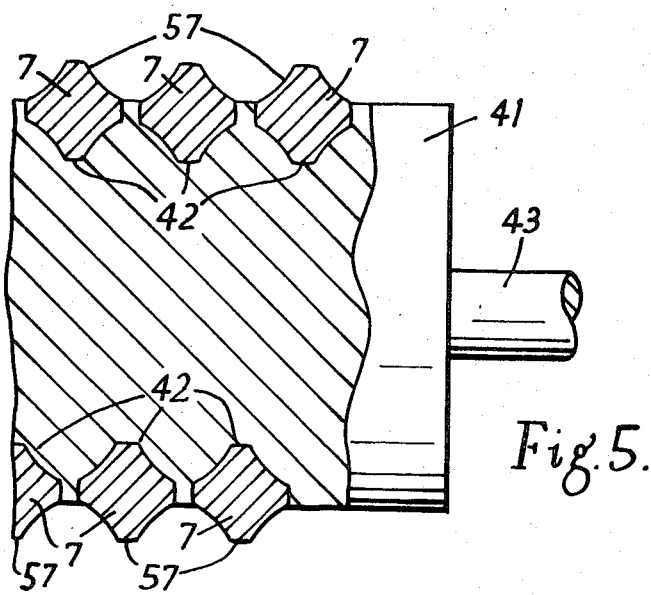
FIG. 5 shows a part of the apparatus of FIG. 4 in section.

The final configuration of the wire 57 wound into a helix on the roller 41 is shown in more detail in FIG. 5 in which it can be seen that the cross-section of the groove 42 mates with half the cross-section 7 of the wire 57.

When the groove 42 has been filled by a length of the wire 57, the wire is cut on the roller 41 along a straight groove 59 in the roller 41, the groove 59 being parallel to the axis of the roller. The cutting may be conveniently effected by means of a milling cutter (not shown) translated along the groove 59.

The first formed turn of the helix of wire 57 is then released from the clamp 56 and each turn, now separated from the adjacent turns by virtue of the cut effected as aforesaid, is opened just enough to allow the removal of the turn to the left in FIG. 4 axially of the roller 41, the clamp 56 preferably being previously removed from the roller 41.

As soon as each separate turn of the wire 57, except the said first formed turn which is discarded, is released from all constraint, it returns resiliently to a truly planar ring form with the cut ends of the turn opposing one another. This result is achieved by virtue of the small pitch of the helical groove 42 and the built-in tendency of the wire helix to contract axially which results from the feeding of the wire 57 onto the roller 41 at the said predetermined angle by the tensioning head 58.

Rollers of different diameters and groove cross-sections are substituted for the roller 41 in accordance with the required diameter of ring to be formed and the cross-section of wire.

Figure 6:
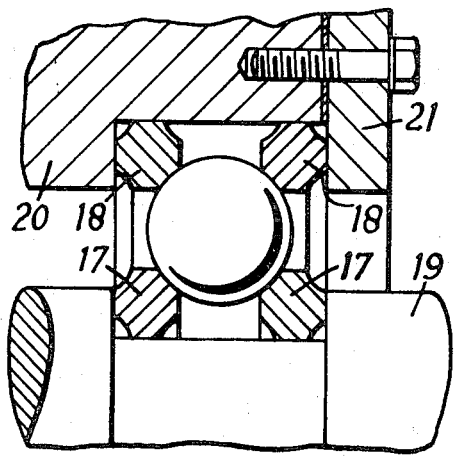
FIG. 6 is a partial view, partly in section, of an assembled ball-bearing according to the invention and embodying wire race rings formed of wire similar to that shown in FIG. 3.
Figure 7:
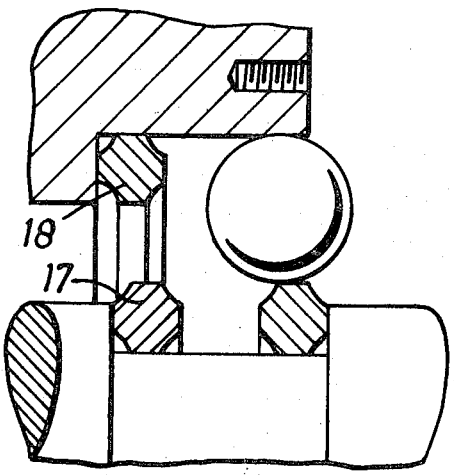
FIG. 7 illustrates the method of assembling the bearing of FIG. 6.

Turning now to FIG. 6 there is shown part of a ball-bearing according to the invention in which two inner wire race rings 17 and two outer wire race rings 18 are formed from wire generally of the same cross-section 7 as the wire of FIG. 3 and formed as described hereinbefore with reference to FIGS. 4 and 5. The inner rings 17 are located in opposite corners of a groove cut in a shaft 19 carried rotatably in a housing 20 provided with a retaining flange 21 bolted thereto. The dimensions of the wire, ball and groove depth are so related that the removal of the retaining flange 21 and one of the outer rings 18 provides at least sufficient clearance of the passage of the balls between the housing 20 and the inner race ring 17 as shown in FIG. 7. It will be observed that a smaller diameter of wire as used in the prior art does not permit assembly as FIG. 7, and necessitates some form of expensive spigotted and bolted construction for assembly purposes. Shaft 19 must be moved left as in FIG. 7 to permit the ball 6 diameter to pass between left-hand ring 18 and right-hand ring 19, then shaft 19 returned to its FIG. 6 position for insertion of the other ring 18.

As can be seen in FIG. 6, only one track on each of the rings 17 and 18 is used. However, the presence of the four tracks on wire having the cross-section 7 of FIG. 3 enables one and the same race ring to be used in any of the four possible positions of races in a bearing. Thus, the inner wire race rings 17 can be interchanged in FIG. 6, an advantage where track wear appears. Also, the rings 18 can be interchanged. Furthermore, the rings 17 can be used as outer race rings in another bearing of smaller overall diameter if required, just as the rings 18 can be used as inner race rings in another bearing of larger overall diameter.

It will be realised therefore that wire of the preferred form illustrated in FIGS. 3 to 10 of the drawings can be formed into a series of rings of different diameters suitable for use in any position in a bearing.

Figure 8:
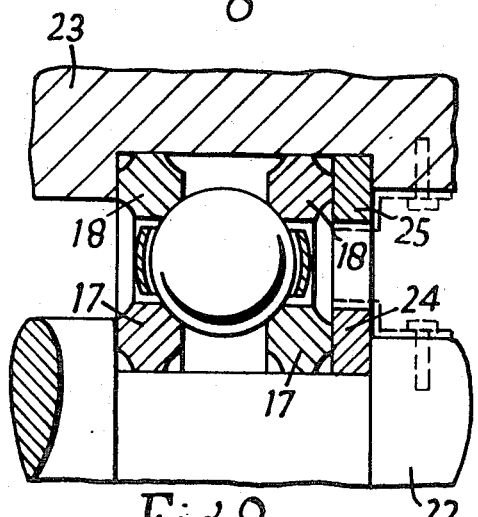
FIG. 8 is a partial view, partly in section, of another assembled ball-bearing according to the invention and embodying wire race rings formed of wire similar to that shown in FIG. 3.
Figure 9:
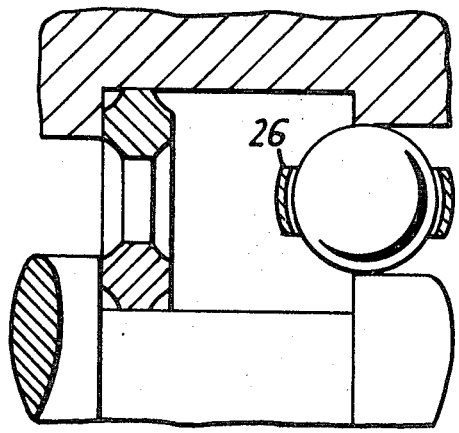
FIG. 9 illustrates the method of assembling the bearing in FIG. 8.

FIG. 8 shows a further direct application of wire race rings 17, 18 to a shaft 22 carried in a housing 23, but eliminating the cost and complication of a retaining flange and screws. The shaft and housing are provided with a wide groove to accommodate the bearing assembly and the width of spacer rings 34, 25 of rectangular cross-section. The width of the spacer rings is chosen so that when extracted from the groove there is sufficient clearance left for the removal or insertion of the contiguous race rings 17, 18, and thus for the assembly of the balls, either separately or in a cage 26, as shown in FIG. 9. The spacer rings may be gapped rings with holes at the ring ends to permit removal with conventional circlip pliers, or they may be arcuate segments held in position for instance by clamp strips 200 and screws 201 as shown in dotted outline. In assembly, left-hand rings 17 and 18 are inserted into their seatings, then caged balls 26 inserted, followed by right-hand rings 17 and 18, then finally the spacers 24 and 25. Thus the assembly does not require composite housing means but can accommodate caged balls 26 and thin wires 17 and 18 by virtue of the packing of the required assembly space with spacers 24 and 25.

Figure 10:
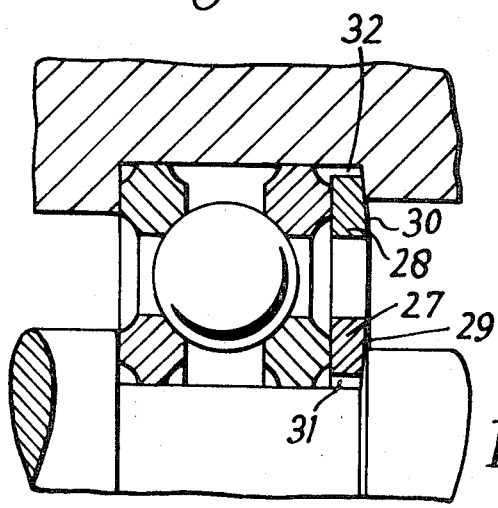
FIG. 10 is a partial view, partly in section, of a modification of the bearing of FIG. 8.

An extension of the principle of FIG. 8 is shown in FIG. 10, in which resilient circlips 27, 28 are provided with sloping sides 29, 30 abutting complementary sloping sides in the shaft and housing grooves. The circlips are biassed to spring into their respective grooves, and the initial dimensions of the components are determined so that the circlips are not able fully to expand into their seatings, as shown by the spaces 31, 32. The bearing is thus pre-loaded to an extent dependent upon the spring characteristics of the circlip and the angle of its sloping side, and the pre-loading will be maintained despite track wear or distortion until the circlips have fully expanded into the spaces 31, 32. Assembly of the bearing of FIG. 10 is substantially as described with reference to FIG. 8 and has the same advantages of thin wire rings, large balls, and simple housing means.

The slope of the sides 29, 30 will preferably be less than the angle of friction between the groove and the circlip, so that the pre-loading characteristic of the assembly eliminates slackness of the parts and is self-locking against any applied loads. It will be understood that a similar axial compression of the bearing assembly may be induced for instance by the use of a ring having a circuar cross-section instead of a tapered circlip between a sloping side of the groove and a radial side of the wire race; or between the radial side of the groove and a sloping side of the wire race, or by similar combinations.

Figure 11:
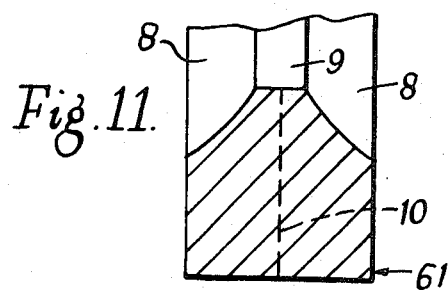
FIG. 11 shows one end of another wire for use in making a wire-race bearing according to the invention.

FIG. 11 shows a wire having two concave tracks 8 separated by a land 9, the cross-section 61 of the wire being divisible by one plane, the trace of which is shown at 10, into two halves having mirror symmetry relative to the plane. Such a wire may be formed and bent into rings in the same manner as the wire of cross-section 7, the roller 41 of FIG. 4 being replaced by a roller having a rectangular cross-section helical groove 42 when inner race rings are to be formed of the wire of FIG. 11. The wire with cross-section 61 is particularly suitable where race rings are required to fit into rectangular seatings.

Figure 12:
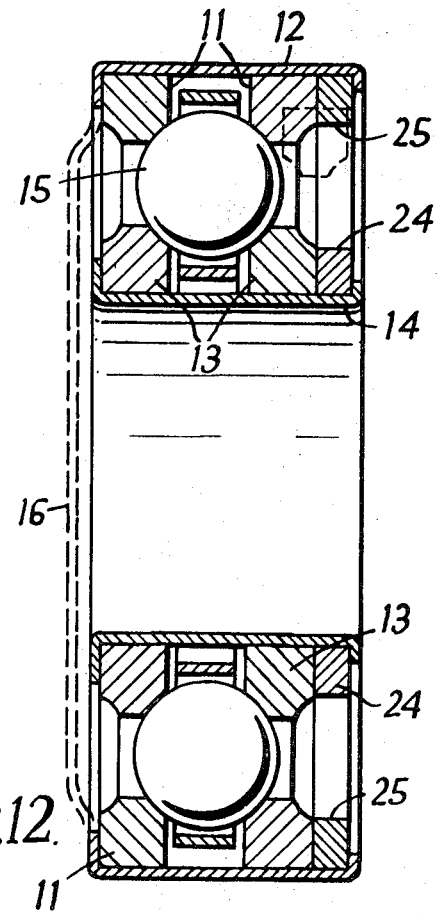
FIG. 12 is a cross-sectional view of a further ball-bearing according to the invention and which embodies wire race rings formed of the wire shown in FIG. 11.

In FIG. 12 there is shown a ball-bearing assembly in which two outer wire race rings 11 are located in a thin outer metal shell 12 and two inner wire race rings 13 are located in a thin inner metal shell 14. A series of balls 15 fitted in a cage are closely fitted between the inner and outer rings 13 and 11. The shells 12 and 14 are wide enough to accommodate the rings 11 and 13, the balls 15 and the width of two spacer rings 34 and 25 of rectangular circlip form. The width of the spacer rings 24 and 25 in the axial direction of the bearings is such that in their absence there is sufficient clearance for the removal or insertion of the two contiguous race rings 11 and 13 while the balls 15 and the other two race rings 11 and 13 are in place as shown in FIG. 12. A position during assembly or disassembly of the contiguous ring 11 is shown in broken lines in FIG. 12. Thus although the shells 12 and 14 are of thin metal, and can be formed accurately, completely, and economically by a simple conventional metal pressing operation, once they have acquired the closed shapes shown in FIG. 12 the other elements of the bearings, elements 11, 13, 15, 24 and 25, can nevertheless be assembled into or removed from the shells 12 and 14 without distortion of either the shell 12 or the shell 14 being necessary. In assembling the bearing shown in FIG. 12, two of the ring races 11 and 13 are inserted in the shells 12 and 14 respectively, then the balls 15 in their cage are inserted until the balls 15 fit against the tracks formed on the two races in the shells, then the other two races 11 and 13 are inserted, and finally the spacer rings 24 and 25 are inserted. Thus the mode of assembly is substantially as for the bearing of FIG. 8 and has the associated advantages of enabling thin rings, large balls, and simple housings to be utilised by virtue of the packing of assembly space by spacers 24 and 25, the annular side walls of the shells 12 and 14 being low enough for the bearing balls to be entered into the housings but high enough to retain the spacers 24 and 25. The race rings 11 and 13 are formed from wire of substantially the cross-section 61 shown in FIG. 11 and are bent in such a manner that the land between the tracks on the wire is rendered substantially cylindrical, the wire having radiused seating corners. Each ring race is provided with a small gap.

The dimensions of the parts are chosen so that the final "sizing" of the bearing assembly is performed by pressing it on to a shaft and into a housing of prescribed accuracy on final installation. The gap in the circumference of the race rings ensures that the consequent increase or decrease of diameter does not stretch or compress the track wire and thereby damage the track characterstcis.

Where a bearing according to FIG. 12 is situated at a shaft end, it may be provided with a closed outer shell as illustrated in dotted lines 16.

Bearings according to FIG. 12 are envisaged as complementary to well-established drawn-cup needle roller bearings in applications involving end thrust and journal loads.

Figure 13:
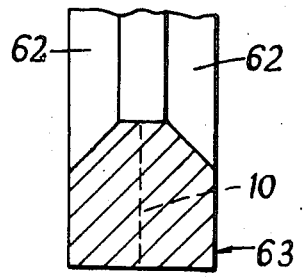
FIG. 13 shows one end of a modification of the wire of FIG. 11.

A modification of the cross-section 61 of FIG. 11 is shown in FIG. 13 in which two flat tracks are formed on the wire, resulting in the cross-section 63. The cross-section 63 has again mirror symmetry relative to one plane, the trace 10 being shown, which halves the cross-section. Wire race rings formed from the wire of cross-section 63 have an axis of curvature which is perpendicular to the said plane.

Relating FIGS. 11 and 13 to FIG. 3 it can be seen that the cross-sections 61 and 63 correspond to the cross-section 7 with equal corresponding amounts of material added to each half of the cross-section divided by the trace 10.

It has been found that a characteristic of wire of such cross-sections is that when bent into arcuate form about an axis of curvature prependicular to the plane or, as in FIG. 3, one of the planes relative to which the cross-section has mirror symmetry, the wire has substantially no tendency to twist. However, the property of having substantially no tendency to twist when bent is not confined to cross-sections having mirror symmetry relative to a plane which is at right angles to the axis of curvature about which an element of the wire is bent into arcuate form such as, for example, a ring. Accordingly, the present invention provides a wire race formed from wire of the cross-section 64 shown in FIG. 14, the wire being bent about an axis of curvature at right angles to the trace 65 which divides the cross-section 64 into an area 66 in the form of an isoceles triangle and a semi-circular area 65. The triangular area 66 provides two tracks 68 and 69 which can serve respectively as outer or inner tracks in a ball-bearing. The relative proportions of the areas 66 and 67 and the apex angle of the area 66 can be adjusted at the design stage experimentally so that relative to the said axis of curvature which is perpendicular to the trace 65 the bending of the wire as aforesaid is effected in a stable bending orientation of the wire, that is, an orientation of the wire relative to the axis of curvature for which the wire has substantially no tendency to twist as it is bent.

The cross-section 64 is particularly advantageous in bearings in which a curved seating is required, the semi-circular area 67 cooperating with the curved seating to allow the wire ring race to accommodate variations in the direction of thrust in the bearing in operation.

FIG. 15 shows a further wire of asymmetrical cross-section 70 which is bent about an axis of curvature at right angles to a plane the trace of which is indicated at 71. The cross-section 70 includes a concave track 72, a curved seating 73, for seating in the corner of a groove in a body shown in dotted outline, and chamfers 74 and 75. The cross-section 70 is arrived at by a free selection of most of the outline of the cross-section 70, and a completion of the outline of the cross-section 70 experimentally guided determination for a stable bending orientation allowing stable bending about the said axis of curvature which is at right angles to the plane indicated by the trace 71. The track 72 has a conforming radius approximately 5% greater than that of the ball intended to run thereon. Other asymmetrical cross-sections can be used without departing from the invention, final determination of the outline of the cross-section being arrived at as described with reference to FIG. 15.

Although the ball-bearings specifically described hereinbefore as embodying the invention have utilised wire race rings made by forming wire into a ring, other embodiments of the invention can be constructed in which one or more of the race rings is composed of a plurality of separate arcuate segments. Such segmental rings are particularly advantageous where bearings for heavy loads may require rings several inches thick to be made.

Also, wire-race ball-bearings in accordance with the invention can be constructed in forms other than circular forms, and therefore the term wire race rings is to be understood as including non-circular substantially closed loops.

For the forming of rings or arcs it may alternatively be convenient to use the well known three-roller arrangement in which the wire is driven across two rollers, a third roller being intermediately pressed against the wire from the opposite side. Relative positioning of the rollers determines the curvature to which the wire is bent. The bending is, in accordance with the invention, effected with the wire in a stable bending orientation thereof. The rollers may be grooved to accommodate and control the wire in said stable bending orientation. This method is particularly suitable where the wire is of heavy material or where the arcuate elements of the race to be formed are separate segments.

Although the particular bearings described hereinbefore which embody the invention have all included inner and outer housing means, for example the shaft 19 and the housing 20 of FIG. 6, the invention is of course not limited to such bearings but may comprise, for example in a thrust bearing, an upper housing means in which two upper wire race rings are housed and a lower housing means in which two lower wire race rings are housed. Also, composite housing means are included within the scope of the invention, as shown for example in FIGS. 1 and 2 where the driving gear 103 and the turntable 101 comprise a composite housing, the wire race rings 106 to 109 of the prior art being replaced by wire race rings in a stable bending orientation of the wire, in accordance with the present invention.

I claim:

1. A method of manufacturing a wire-race ball-bearing, including the steps of:
   (a) forming two inner and two outer race rings from wire of uniform non-circular cross-section, the cross-section including a track therein and having mirror symmetry relative to at least one plane, by bending the wire into arcuate elements about an axis of curvature perpendicular to the said plane,
   (b) assembling at least one inner and one outer race ring into inner and outer spaced housing means respectively, and
   (c) subsequently completing the assembling of the bearing, the assembled bearing including a plurality of bearing balls located between the two inner and the two outer race rings and in contact with said tracks therein.

2. A method as claimed in claim 1, wherein subsequent to the step of assembling of one inner and one outer race ring into the inner and outer housings respectively, a further one of the race rings is assembled into its respective housing, then the plurality of balls is introduced into the space between the housings, and the fourth race ring subsequently assembled into its respective housing.

3. A method as claimed in claim 1, wherein the step of completing the assembling of the bearing includes the step of inserting two spacer rings respectively into the housings, each spacer ring lying between one race ring and a wall of the respective housing.

4. A method of manufacturing a ball-bearing having wire race rings, the method including the steps of:
   (a) forming two first and two second race rings from wire of uniform non-circular cross-section including a pre-formed track by bending the wire into arcuate elements in a stable bending orientation of the wire,
   (b) assembling at least two of the said race rings into housing means, and
   (c) subsequently completing the assembling of the bearing, the assembled bearing including a plurality of bearing balls located between the two first and the two second race rings and in contact with said track in each ring.

5. A method of manufacturing a wire race for a wire-race ball-bearing, including the steps of:
   (a) forming wire of a uniform cross-section which includes a ball track, the wire having at least one stable bending orientation,
   (b) forming an arc of the wire by bending a length of the wire in the said stable bending orientation.

6. A method of manufacturing a wire-race ball-bearing including the steps of:
   (a) forming wire of a uniform cross-section which includes at least one ball track, the wire having at least one stable bending orientation,
   (b) forming two first and two second race rings from said wire by bending lengths of the said wire in the said stable bending orientation, and
   (c) assembling the said race rings together with a plurality of bearing balls into housing means, the assembled bearing having the bearing balls located between the two first and the two second race rings and in contact with the said track in each ring.

7. A method according to claim 6 wherein the said uniform cross-section is non-circular and has mirror symmetry relative to at least one plane, and the bending of the wire is effected about an axis of curvature which is perpendicular to the said plane.

8. A method according to claim 6, wherein two of the said race rings which are respectively inner and outer race rings are introduced into spaced housings which are inner and outer housings respectively.

9. A method according to claim 8, wherein subsequent to introducing one inner and one outer race ring into the inner and outer housings respectively, a further one of the race rings is assembled into its respective housing, then the plurality of balls is introduced into the space between the housings, and the fourth race ring subsequently is assembled into its respective housing.

10. A method according to claim 8, wherein the inner and outer housings are displaced axially of one another during assembly in order to permit the bearing balls to be introduced into the housings.

11. A method according to claim 8, wherein a side wall of one of the housings is secured in position after the fourth race ring has been assembled in its respective housing.

12. A method according to claim 6, wherein the step of assembling the bearing includes inserting a spacer between one of the wire-race rings and an adjacent side wall of the housing means.

13. A method according to claim 6, wherein a further spacer is inserted between the adjacent side wall of the housing means and another of the wire-race rings.

14. A method according to claim 6, wherein the step of assembling the bearing includes spacing two of the race rings apart in a groove in the housing means.

15. A method according to claim 12, wherein the step of inserting the spacer element includes wedging the spacer element between the said one race ring and the said wall.

16. A method according to claim 6, further including the step of forming the housing means as inner and outer thin shells of metal.

17. A method according to claim 6, wherein the housing means is formed by bringing two integral members, each having a groove therein to receive the respective wire-race rings, into coaxial relation.

18. A method according to claim 6, wherein the step of forming the race rings includes forming the said lengths into arcs.

19. A method of manufacturing a wire-race ball-bearing including the steps of:
  (a) forming wire of a uniform non-circular cross-section which includes at least two ball tracks, the cross-section of the wire being divisible by one plane into two halves having mirror symmetry relative to the plane and each half including one of the said two tracks,
  (b) forming two first and two second race rings from the said wire by bending lengths of the said wire in the said plane, and
  (c) assembling the said race rings together with a plurality of bearing balls into housing means, the assembled bearing having the bearing balls located between the two first and the two second race rings and in contact with a respective one of the said tracks in each ring.

20. A method according to claim 19, wherein the step of assembling the bearing includes locating the two first rings and one of the second rings in the housing means, locating the bearing balls in contact with respective tracks of the first rings and the second ring, and subsequently locating the other second ring in the housing means, the dimensions of the rings, balls and housing means being so related that the removal of a retaining flange of the housing means provides at least sufficient clearance for the passage of the balls between the housing means and one of the first rings before the said second outer ring is located in the housing means.

21. A method according to claim 19, wherein the step of assembling the bearing includes locating respective first and second spacer members between one first ring and a wall of the housing means and between one second ring and a wall of the housing means respectively, the width of each spacer member in the axial direction of the bearing being such that before the spacer members are located in the housing means there is sufficient clearance for the insertion of the said one first ring and the said one second ring into the housing means for location therein after the bearing-balls have been located in contact with respective tracks on the other first and second rings.

References Cited

UNITED STATES PATENTS

| | | | |
|---|---|---|---|
| 2,399,847 | 5/1946 | Bauersfeld | 308—216 |
| 2,917,351 | 12/1959 | Franke et al. | 29—148.4 |
| 3,081,135 | 3/1968 | Olson | 308—195 |
| 3,099,073 | 7/1963 | Olson | 29—148.4 |
| 3,370,333 | 2/1968 | Gibson | 29—148.4 |

THOMAS H. EAGER, Primary Examiner

U.S. Cl. X.R.

29—434; 308—216